Dec. 18, 1934.         C. N. HATFIELD         1,985,167
GRAIN CLEANING MACHINERY
Filed July 1, 1933         2 Sheets-Sheet 1

Inventor
Chas. N. Hatfield
By E. W. Anderson
Attorney

Dec. 18, 1934.  C. N. HATFIELD  1,985,167
GRAIN CLEANING MACHINERY
Filed July 1, 1933  2 Sheets-Sheet 2
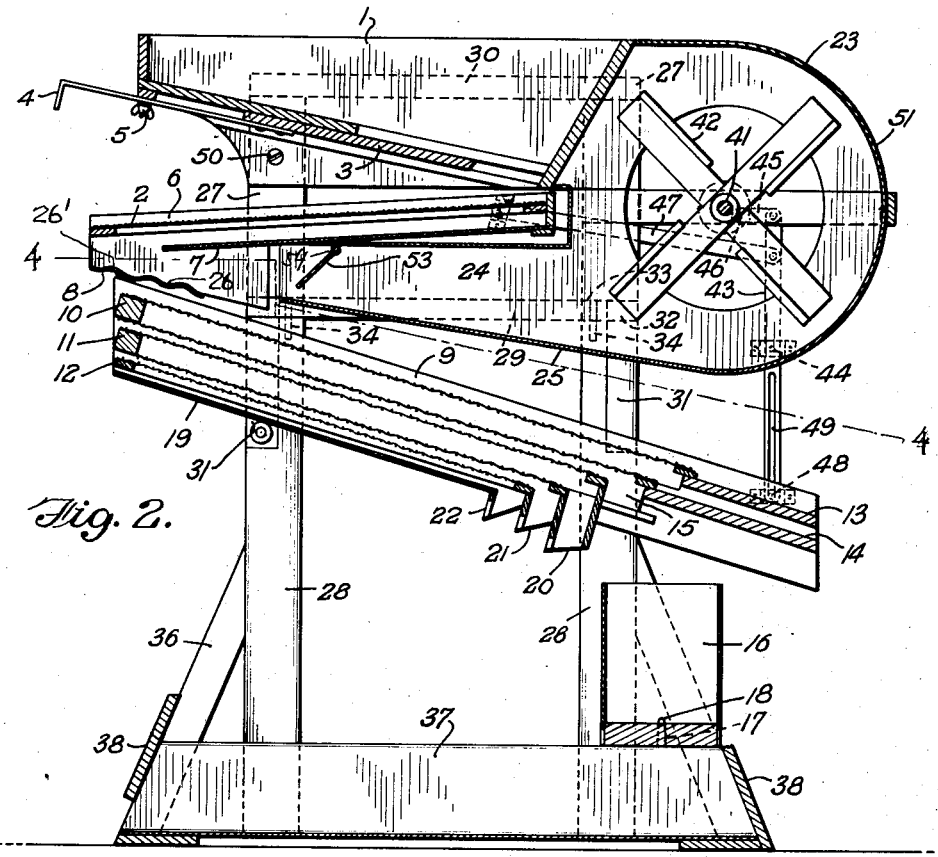

Patented Dec. 18, 1934

1,985,167

UNITED STATES PATENT OFFICE 1,985,167

GRAIN CLEANING MACHINERY

Charles N. Hatfield, Fountain City, Ind.

Application July 1, 1933, Serial No. 678,681

9 Claims. (Cl. 209—33)

The invention has relation to grain cleaning machinery, an object being to provide the machine with a supporting base wherefrom it may be lifted and wherein it may be inserted to thereby considerably reduce the cubic contents for shipment and storage purposes and to protect the machine in transit. Another object is to render the hopper and the upper half or portion of the fan casing removable as a unit to thereby facilitate access to the interior of the machine for repair purposes, etc. Another object is to increase the efficiency of the machine. Other objects and advantages will appear hereinafter.

The invention consists in the novel construction and combinations of parts as set forth in the appended claims.

In the accompanying drawings illustrating the invention.

Figure 2 is a central vertical section of the invention.

Figure 4 is a section on the line 4—4, Figure 3.

Figure 1:
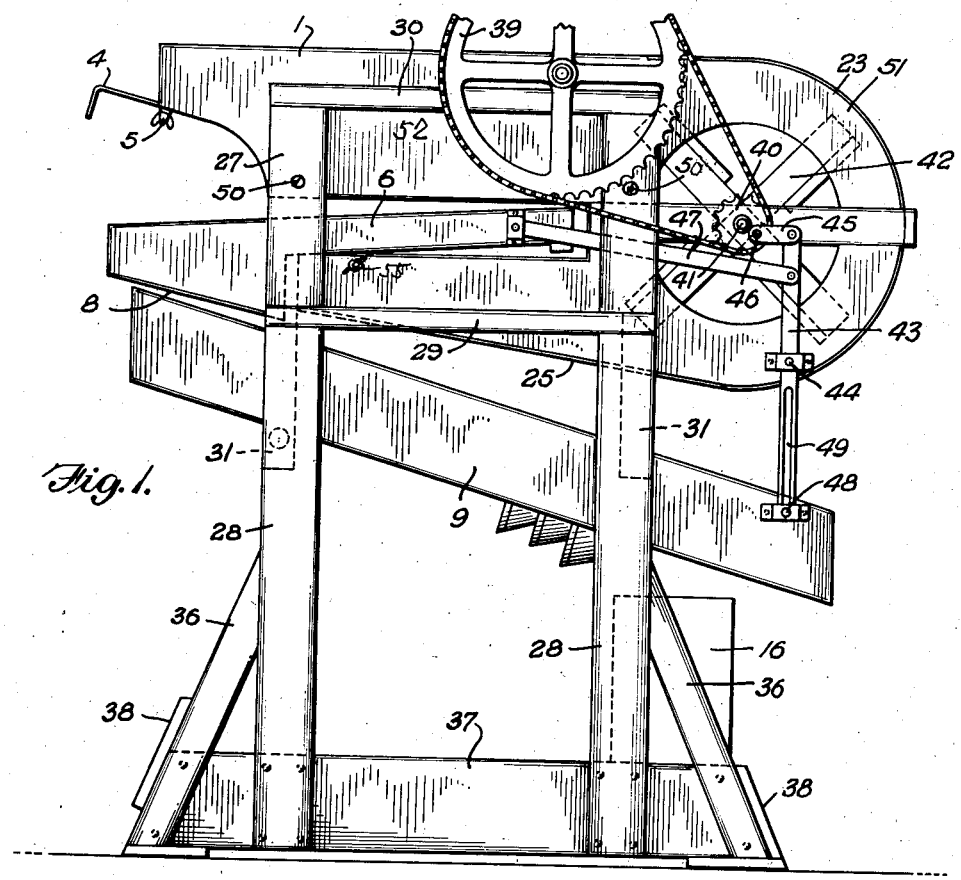
Figure 1 is a side view of the machine.
Figure 3:
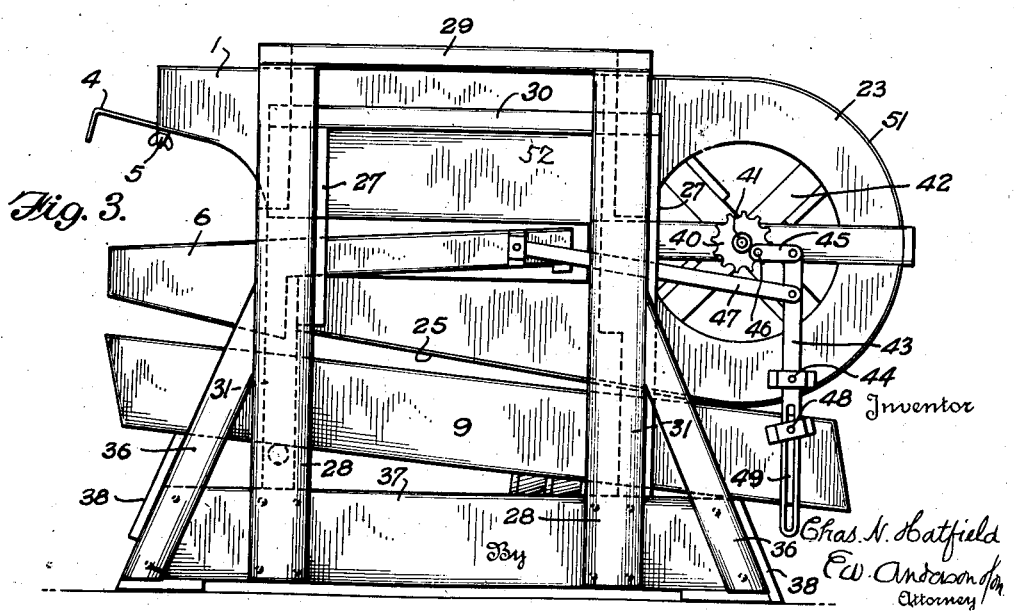
Figure 3 is a view similar to Figure 1 with machine lifted from its supporting base and inserted within said base.

In these drawings, the numeral 1 designates the hopper, wherein the grain or grain and seed are dumped, and which feeds the same to the upper end of the chaff screen 2, said hopper having a slide gate 3, provided with an operating handle iron 4, adjustment of which is controlled by a clamping wing nut 5, upon a suitable bolt.

The chaff screen 2 is removably fitted in the upper or chaff shoe 6 and has a downward incline from said hopper, being provided with a bottom or grain board 7, the latter discharging upon a deflector 8, secured to said shoe and having an inclination opposite to that of said screen and said grain board.

The lower or combination shoe 9, has an inclination opposite to that of the upper shoe and is adapted to carry two double screens 10 and 11 and one single screen 12, all slidably mounted therein, thereby providing for handling a variety of sizes of grain and seed in a single operation and without changing screens, the discharge of grain or of grain and seed from both screens of the upper double screen being at the lower end of the shoe at 13 and 14 at opposite sides of the shoe, and the discharge of finer impurities being centrally of the lower end of the shoe at 15, this discharge being from the upper screen of the lower double screen into detachable box 16, said box having end notches 17 formed in the projecting ends of its bottom, said notches being engaged by pins 18, of the framing.

The discharge of grass seeds from the lower screen of the lower double screen, from the lowermost or single screen, and from the bottom or seed board 19, is through spouts 20, 21, and 22, located at the lower end of the lower shoe along the bottom thereof, the discharge from said spouts being respectively at each of opposite sides of the shoe and centrally of the shoe. The fan casing 23, has a lower air duct or chute 24, located between the upper and lower shoes, the bottom 25 of said duct having a lesser inclination than that of the deflector 8 aforesaid.

The deflector 8 is provided with a plurality of shallow rounded grooves and intervening ridges 26, 26', being usually made of corrugated metal, the grain or grain and seed being discharged thereon from the upper or chaff screen and tending to some extent to accumulate in said grooves out of the way of the air blast, without however preventing downward movement of the grain and seed in the shaking of the shoe, thereby releasing said air blast, which is consequently more effective in the removal of the coarser impurities. The deflector moves with the upper shoe and the push to the grain and seed in the deflector grooves in the movement of the shoe and deflector towards the fan adds to the effect of the air blast in the removal of impurities. The grooves of the deflector also act as a brake for and retard movement of the seed and grain with the air blast.

The machine has two supporting standards 27 at each side thereof, composed of upper and lower sections 27 and 28, the lower of which are located without the upper sections and have a connecting cross bar 29 for each couple thereof, the cross bars being each of a width equal to the combined width of both standard sections. The upper standard sections have also a connecting cross bar 30 for each couple thereof across the tops of the sections, the air duct 24 connecting these upper standard sections at the lower portions thereof.

The upper standard sections have reduced extensions 31 fitting in end notches 32 of the lower cross bars 29, and are also provided with shoulders 33 resting upon said cross bars. In order to further provide for rigidity, the upper standard sections are provided with lower pins 34 engaging seats of the lower cross bars and standard sections.

The lower standard sections 28 at each side of the machine are provided with inclined braces 36; a receptacle 37 at the base of the machine having sides connecting said sections and braces at the lower end portions thereof and having ends 38 connecting the endmost of said braces, the supporting lower standard sections at the two sides of the machine being thereby rendered rigid and stable.

The means for vibrating the shoes comprise sprocket gearing having large sprocket 39 having chain connection with small sprocket pinion 40 on the shaft 41 of the fan 42, upright shaker bars 43 fulcrumed intermediately of their length at 44, links 45, connecting the upper end of the shaker bars or levers with crank pins 46 of the sprocket pinions; bars 47 connecting the upper ends of the shaker levers with the upper shoe, the lower ends of the shaker levers having pivotal connection at 48 with one end of the lower shoe to vibrate the same, the sprocket gearing being located at one side only of the machine and the other parts stated being located one set at each side of the machine. The shaker levers serve also as suspension or hanger means for the lower end of the lower shoe, said levers having lower longitudinal slots 49, wherein the pins 48 are adapted to move in the folding upward of the lower end of the lower shoe to approximately horizontal position when the machine is to be taken down for shipment or storage.

The entire machine is adapted to be lifted from the upper cross bars of the lower standard sections and inserted within the lower standard sections below said cross bars, to thereby reduce the cubic contents of the machine and obtain a lower freight rate. The large sprocket wheel and the sprocket chain are of course first removed.

The lower receptacle 37 at the base of the machine serves to rigidly connect the lower standard sections transversely as stated and also forms a receptacle to catch seed or grain and to carry extra screens and parts.

If there should be no grass seed in the grain to be cleaned, the lower double screen and the lowermost single screen would be removed.

The hopper 1, has removable or screw connections 50 with the upper sections 27 of the supporting standards at both ends of the machine, and an upper section 51 of the fan casing comprising nearly one half of the same, is removable with respect to the lower section of the fan casing, said hopper and said upper section of the fan casing being horizontally aligned and rigidly connected together by means of integral side frames 52 or in other equivalent manner, whereby the hopper and the upper section of the fan casing may be readily removed as a unit, to facilitate access to the interior of the fan casing and to the air chute below the upper shoe, both the upper and the lower shoe being removable.

An air deflector 53 is provided in the air chute 24, to regulate the force of the air blast, adjustment of said deflector being controlled by a wing nut 54 threaded on an extension of the pivot rod 55 of the deflector.

I claim:—

1. In grain cleaning machinery, a hopper, upper and lower vibratory shoes having screens, a fan casing, a fan therein, two supporting standards at each side of the machine composed each of upper and lower sections the lower of which are located without the upper sections and having a connecting cross bar for each couple thereof, the cross bars having end notches, the upper sections having reduced extensions fitting in said notches and shoulders resting upon the cross bars, the entire machine being liftable from said cross bars and insertible within the lower standard sections below said cross bars.

2. In grain cleaning machinery, a hopper, upper and lower vibratory shoes having screens, a fan casing, a fan therein, means for vibrating said shoes including slotted shaker levers, two supporting standards at each side of the machine composed each of upper and lower sections the lower of which are located without the upper sections and have a connecting cross bar for each couple thereof, said cross bars having end notches, the upper sections having reduced extensions fitting in said notches and shoulders resting upon the cross bars, the lower shoe being foldable upwardly to approximately horizontal position to the extent of the length of the slots of said levers, the entire machine being liftable from said cross bars and insertible within the lower standard sections below said cross bars.

3. In grain cleaning machinery, a hopper, upper and lower vibratory shoes having screens, a fan casing, a fan therein, two supporting standards at each side of the machine each composed of upper and lower sections the lower of which are located without the upper sections and having a connecting cross bar for each couple thereof, said cross bars having end notches, the upper standard sections having also a connecting cross bar for each couple thereof, the fan casing having an air chute located between the upper and lower shoes and connecting the upper standard sections at the lower portions thereof, said upper sections having extensions fitting in said notches and shoulders resting upon the lower cross bars, the entire machine being liftable from the lower cross bars and insertible within the lower standard sections below said cross bars thereof.

4. In grain cleaning machinery, a hopper, upper and lower vibratory shoes having screens, a fan casing, a fan therein, means for vibrating said shoes including slotted shaker levers, two supporting standards at each side of the machine each composed of upper and lower sections the lower of which are located without the upper sections and having a connecting cross bar for each couple thereof, said cross bars having end notches, the upper standard sections having also a connecting cross bar for each couple at the tops thereof, the fan casing having an air chute connecting said upper sections at the lower portions thereof, said upper sections having extensions fitting in said notches and shoulders resting upon the lower cross bars, the lower shoe being foldable upwardly to the extent of the lengths of the slots of said levers, the entire machine being liftable from the lower cross bars and insertible within the lower standard sections below said cross bars thereof.

5. In grain cleaning machinery, a hopper, upper and lower vibratory shoes having screens, a fan casing, a fan therein, means for vibrating said shoes including slotted shaker levers forming hangers for the lower end of the lower shoe, two supporting standards at each side of the machine composed each of upper and lower sections the lower of which are located without the upper sections and have a connecting cross bar for each couple thereof of a width equal to the combined width of both sections, said cross bars having end notches, the upper sections having extensions engaging said notches and shoulders resting upon said cross bars, certain of said extensions having supporting rollers for the upper ends of the lower shoe, the latter being foldable upwardly to the extent of the length of the notches of the shaker levers, the entire machine being liftable from said cross bars and insertible within the lower standard sections below the cross bars thereof.

6. In grain cleaning machinery, a hopper, upper and lower vibratory shoes having screens, a fan casing, a fan therein, means for vibrating said shoes including slotted shaker levers forming hangers for the lower end of the lower shoe, two supporting standards at each side of the machine composed each of upper and lower sections the lower of which have a connecting cross bar for each couple thereof and are located without the upper sections, the cross bars being each of a width equal to the combined width of both sections and having end notches, the upper standard sections having also a connecting cross bar for each couple thereof at the tops, the fan casing having an air chute connecting the upper sections at the lower portions thereof, the upper sections having extensions engaging said notches and shoulders resting upon the lower cross bars, certain of said extensions having supporting rollers for the upper end of the lower shoe, the latter being foldable upwardly to the extent of the length of said slots of the shaker levers, the entire machine being liftable from the lower cross bars and insertible within the lower standard sections below the cross bars thereof.

7. In grain cleaning machinery, a hopper, upper and lower removable vibratory shoes having screens, a fan casing having an air chute located below the upper shoe, said fan casing having an upper approximately semi-cylindrical removable section, two supporting standards at each side of the machine, said hopper being located entirely above said upper shoe and having removable connection with certain of said standards, said hopper and the upper section of the fan casing being rigidly connected, horizontally aligned and removable as a unit to facilitate access to the interior of the fan casing and to said air chute, the rear walls of said hopper forming the front wall of the fan chamber.

8. In grain cleaning machinery, a hopper, upper and lower vibratory shoes having screens, a fan casing, a fan therein, two supporting standards at each side of the machine composed each of upper and lower sections the lower of which are located without the upper sections and having a connecting cross bar for each couple at the tops thereof, a base receptacle connecting said lower standard sections at the bottoms thereof, said cross bars having end notches, the upper sections having extensions fitting in said notches and shoulders resting upon said cross bars, the entire machine being liftable from said cross bars and insertible within the lower standard sections below said cross bars and above said base receptacle.

9. In grain cleaning machinery, upper and lower vibratory shoes having screens, a fan casing having an air chute located between and delivering at the approximated ends of said shoes, the upper shoe having a bottom or grain board, and a grain deflector located in said air chute at the outlet end thereof below and having inclination opposite to that of said grain board and delivering to the upper screen of the lower shoe; said grain deflector being approximately aligned with the bottom of said air chute and having a plurality of transverse grooves in its upper surface wherein a portion of the grain and seed being deflected will be collectible and shielded from the air blast to thereby release the air blast.

CHARLES N. HATFIELD.